(12) United States Patent
Kim et al.

(10) Patent No.: US 8,878,798 B2
(45) Date of Patent: Nov. 4, 2014

(54) TOUCH SCREEN PANEL DISPLAY

(75) Inventors: Dong Sub Kim, Suwon-si (KR); Hak Yeol Kim, Hwaseong-si (KR); Jin Goo Kang, Gunpo-si (KR); Hoon Do Heo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 278 days.

(21) Appl. No.: 13/410,416

(22) Filed: Mar. 2, 2012

(65) Prior Publication Data
US 2012/0223913 A1 Sep. 6, 2012

(30) Foreign Application Priority Data

Mar. 4, 2011 (KR) .................. 10-2011-0019463

(51) Int. Cl.
*G06F 3/041* (2006.01)
*G06F 3/044* (2006.01)

(52) U.S. Cl.
CPC .................................... *G06F 3/044* (2013.01)
USPC ........................................ 345/173; 178/18.06

(58) Field of Classification Search
CPC ....... G06F 3/044; G06F 3/041; G06F 3/0418; G06F 2203/04103; G06F 2203/04111; G06F 3/0416; G06F 3/0412; G06F 3/0202; G06F 1/1632; G06F 1/1669; G06F 1/1692; G06F 2203/04107; G06F 3/016; G06F 3/043

USPC .................................................. 345/173–181
See application file for complete search history.

(56) References Cited

U.S. PATENT DOCUMENTS

| | | | |
|---|---|---|---|
| 7,455,531 B2* | 11/2008 | Hirabayashi et al. | 439/67 |
| 2003/0052867 A1* | 3/2003 | Shigetaka et al. | 345/173 |
| 2004/0061688 A1* | 4/2004 | Nakayama et al. | 345/173 |
| 2005/0099402 A1* | 5/2005 | Nakanishi et al. | 345/173 |
| 2008/0309633 A1* | 12/2008 | Hotelling et al. | 345/173 |
| 2012/0098774 A1* | 4/2012 | Abe et al. | 345/173 |

FOREIGN PATENT DOCUMENTS

KR 10-2010-0054898 A 5/2010

* cited by examiner

*Primary Examiner* — Duc Dinh
(74) *Attorney, Agent, or Firm* — Jefferson IP Law, LLP

(57) ABSTRACT

A touch screen panel display device is provided. The touch screen panel display device includes a Y-touch sensor bonding pattern having a bonding portion bonded to a touch screen Flexible Printed Circuit Board (FPCB), an X-touch sensor bonding pattern positioned toward the touch screen FPCB further than the bonding portion of the Y-touch sensor bonding pattern and having a bonding portion bonded to the touch screen FPCB, and a touch screen FPCB having an X-contact point portion contacting the bonding portion of the X-touch sensor bonding pattern and a Y-contact point portion contacting the bonding portion of the Y-touch sensor bonding pattern. Thereby, an Anisotropic Conducting Film (ACF) swelling failure occurring as a heat is again applied to a location at which bonding is already complete can be prevented.

10 Claims, 8 Drawing Sheets

[a]

[b]

TOUCH SCREEN PANEL DISPLAY

PRIORITY

This application claims the benefit under 35 U.S.C. §119 (a) of a Korean patent application filed on Mar. 4, 2011 in the Korean Intellectual Property Office and assigned Serial No. 10-2011-0019463, the entire disclosure of which is hereby incorporated by reference.

BACKGROUND OF THE INVENTION

1. Field of the Invention

The present invention relates to a touch screen panel display device. More particularly, the present invention relates to a touch screen panel display device for addressing a swelling failure occurring when performing Flexible Printed Circuit Board (FPCB) bonding with a layer in G1F type (glass Indium Tin Oxide (ITO)+ITO film) or G2 type (pattern on glass) touch screen panel display device in which a general GFF type (glass+ITO film+ITO film) capacitance touch screen panel display device is improved.

2. Description of the Related Art

A capacitance touch screen panel display device is typically manufactured as a GFF type capacitance touch screen panel display device having an ITO film in which an X-sensor is formed and an ITO film in which a Y-sensor is formed in glass. However, a G1F type touch screen panel display device having a simplified structure due to a thickness or a cost is also under development. The G1F type touch screen panel display device forms one of an X-sensor and a Y-sensor by coating ITO in printed glass and stacks an ITO film in which the remaining one of the X-sensor and the Y-sensor is adhered to glass with Optical Clear Adhesive (OCA).

FIG. 1 is a diagram illustrating a rear surface of window glass of a touch screen panel display device according to the related art, and FIG. 2 is a cross-sectional view illustrating a process of bonding a touch sensor bonding pattern of FIG. 1 to a touch screen FPCB according to the related art.

Referring to FIGS. 1 and 2, a conventional touch screen panel display device includes window glass 120 in which a Y-touch sensor bonding pattern 121, trace line 124, and a Y-ITO pattern (not shown) are formed and an ITO film 140 in which X-touch sensor bonding patterns 122 and 123, trace lines 125 and 126, and an X-ITO pattern (not shown) are formed. The Y-touch sensor bonding pattern 121 is connected to a Y-ITO pattern by the trace line 124, and the X-touch sensor bonding patterns 122 and 123 are connected to a Y-ITO pattern by the trace lines 125 and 126. The Y-touch sensor bonding pattern 121 and the X-touch sensor bonding patterns 122 and 123 have bonding portions 121a, 122a, and 123a for bonding to a touch screen FPCB 130, respectively.

Such a touch screen panel display device is manufactured by bonding the touch sensor bonding patterns 121, 122, and 123 to the touch screen FPCB 130, as shown in FIG. 2. As shown in FIG. 2(a), after performing a first bonding process to bond the bonding portion 121a of the Y-touch sensor bonding pattern 121 with an X-contact point portion 131 of the touch screen FPCB 130, a second bonding process to bond the bonding portions 122a and 123a of the X-touch sensor bonding patterns 122 and 123 with the Y-contact point portions 132 and 133 of the touch screen FPCB 130 is performed, as shown in FIG. 2(b).

However, because the bonding portions 122a and 123a of the X-touch sensor bonding patterns 122 and 123 and the bonding portion 121a of the Y-touch sensor bonding pattern 121 are arranged on a straight line A-A', as shown in FIG. 1, the bonding portions 122a and 123a of the X-touch sensor bonding patterns 122 and 123 and the bonding portion 121a of the Y-touch sensor bonding pattern 121 are disposed adjacent to each other. Therefore, heat generation at the second bonding process is applied to the Y-touch sensor bonding pattern 121 bonded in the first bonding process, which may create a swelling failure of the Y-touch sensor bonding pattern 121.

SUMMARY OF THE INVENTION

Aspects of the present invention are to address at least the above-mentioned problems and/or disadvantages and to provide at least the advantages described below. Accordingly, an aspect of the present invention is to provide a touch screen panel display device for preventing an Anisotropic Conductive Film (ACF) swelling failure occurring when bonding glass and an Indium Tin Oxide (ITO) film to one touch screen Flexible Printed Circuit Board (FPCB) at G1F or G2 type touch screen panel display devices.

In accordance with an aspect of the present invention, a touch screen panel display device is provided. The touch screen panel display device includes a Y-touch sensor bonding pattern having a bonding portion bonded to a touch screen FPCB, an X-touch sensor bonding pattern positioned toward the touch screen FPCB further than the bonding portion of the Y-touch sensor bonding pattern and having a bonding portion bonded to the touch screen FPCB, and a touch screen FPCB having an X-contact point portion contacting the bonding portion of the X-touch sensor bonding pattern and a Y-contact point portion contacting the bonding portion of the Y-touch sensor bonding pattern.

In accordance with another aspect of the present invention, a touch screen panel display device is provided. The touch screen panel display device includes an X-touch sensor bonding pattern having a bonding portion bonded to a touch screen FPCB, a Y-touch sensor bonding pattern positioned toward the touch screen FPCB further than the bonding portion of the X-touch sensor bonding pattern and having a bonding portion bonded to the touch screen FPCB, and a touch screen FPCB having an X-contact point portion contacting the bonding portion of the X-touch sensor bonding pattern and a Y-contact point portion contacting the bonding portion of the Y-touch sensor bonding pattern.

In accordance with another aspect of the present invention, a touch screen panel display is provided. The display includes a display unit for displaying an image, an Indium Tin Oxide (ITO) film arranged above the display unit, a protector for protecting the touch screen panel display from the outside, and an FPCB arranged between the ITO film and the protector, wherein the protector includes a Y-touch sensor bonding pattern arranged at a lower surface of the protector and having a bonding portion for bonding to a Y-contact point portion of the FPCB, wherein the ITO film includes an X-touch sensor bonding pattern arranged at an upper surface of the ITO film and having a bonding portion for bonding to an X-contact point portion of the FPCB, and wherein the bonding portion of the Y-touch sensor bonding pattern is spaced apart from the bonding portion of the X-touch sensor bonding pattern such that a line perpendicular to the bonding portion of the Y-touch sensor bonding pattern and passing through the bonding portion of the Y-touch sensor bonding pattern does not intersect the bonding portion of the X-touch sensor bonding pattern.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding, but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
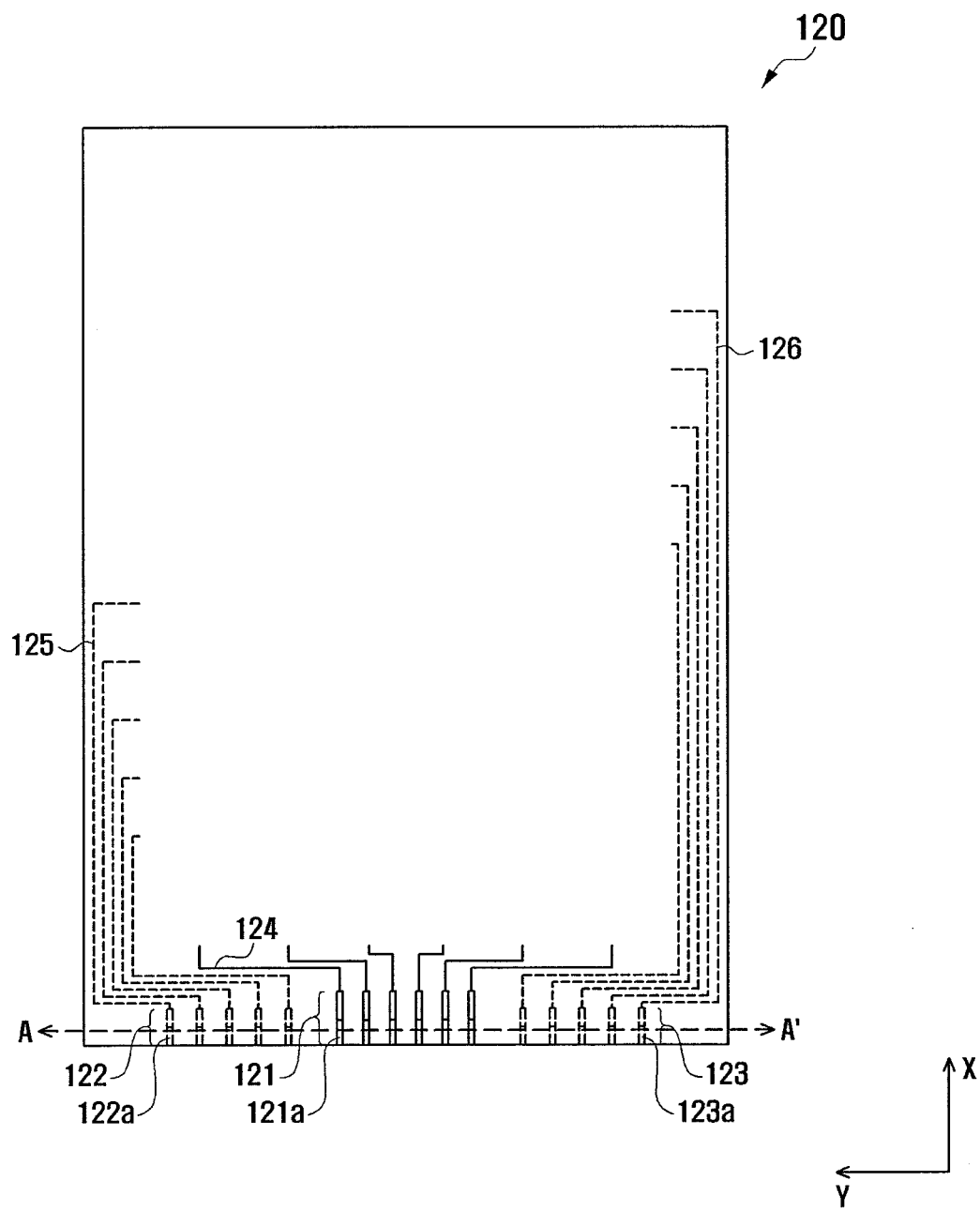
FIG. 1 is a diagram illustrating a rear surface of window glass of a touch screen panel display device according to the related art.
Figure 2:
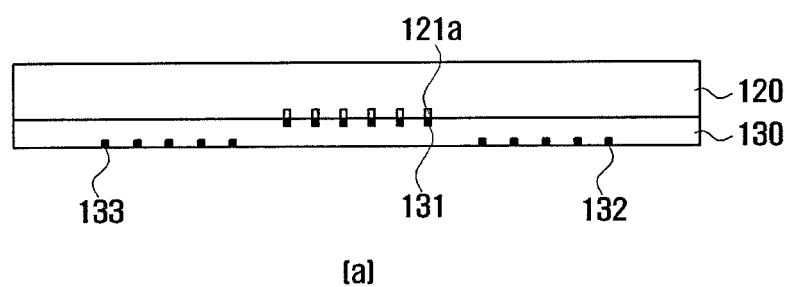
FIG. 2 is a cross-sectional view illustrating a process of bonding a touch sensor bonding pattern of FIG. 1 to a touch screen Flexible Printed Circuit Board (FPCB) according to the related art.
Figure 2:
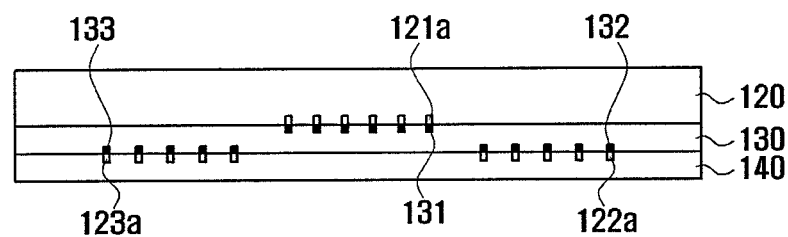
Figure 3:
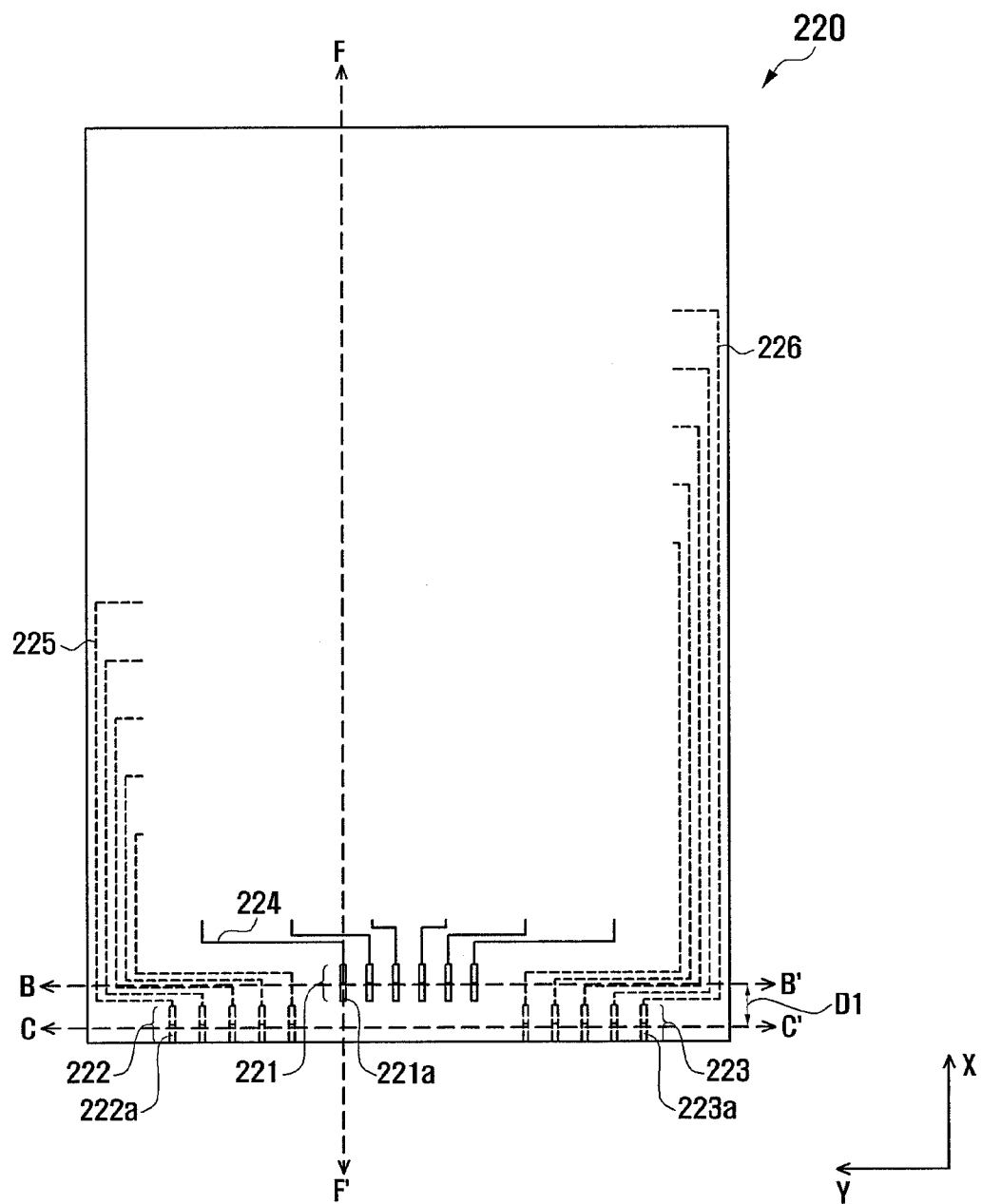
FIG. 3 is a diagram illustrating a rear surface of window glass of a touch screen panel display device according to an exemplary embodiment of the present invention.
Figure 4:
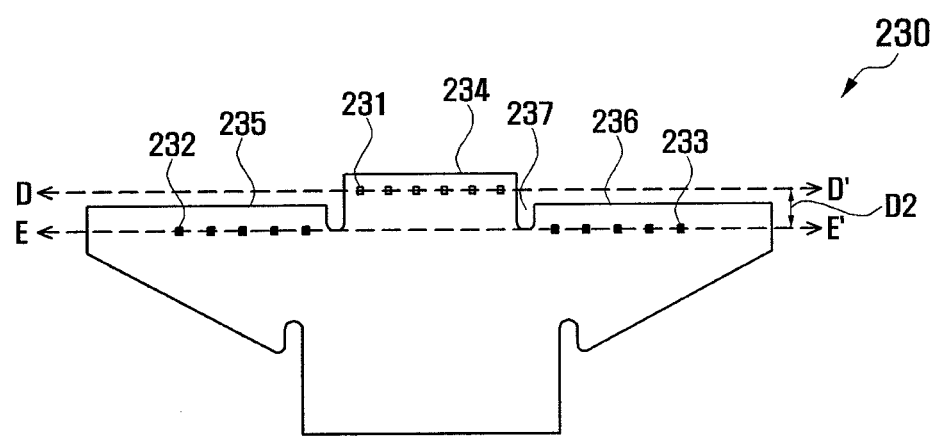
FIG. 4 is a diagram illustrating a lower surface of a touch screen FPCB of a touch screen panel display device according to an exemplary embodiment of the present invention.
Figure 5:
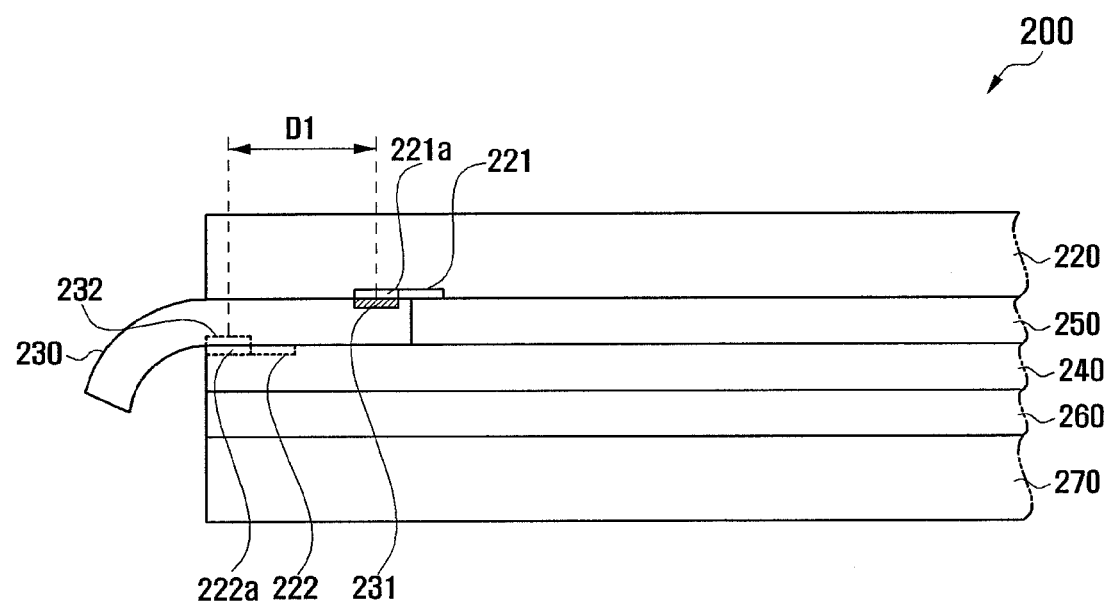
FIG. 5 is a cross-sectional view illustrating a touch screen panel display device taken along a cutting line F-F' of FIG. 3 according to an exemplary embodiment of the present invention.

FIG. 3 is a diagram illustrating a rear surface of window glass of a touch screen panel display device according to an exemplary embodiment of the present invention, FIG. 4 is a diagram illustrating a lower surface of a touch screen Flexible Printed Circuit Board (FPCB) of a touch screen panel display device according to an exemplary embodiment of the present invention, and FIG. 5 is a cross-sectional view illustrating a touch screen panel display device taken along a cutting line F-F' of FIG. 3 according to an exemplary embodiment of the present invention. For reference, X-touch sensor bonding patterns 222 and 223 shown in FIG. 3 and trace lines 225 and 226 connected to the X-touch sensor bonding patterns 222 and 223 are actually formed in an Indium Tin Oxide (ITO) film 240 and are designated by a dotted line.

Referring to FIGS. 3 to 5, a touch screen panel display device 200 includes a display 270, ITO film 240, window glass 220, and touch screen FPCB 230. The touch screen panel display device may be a component of a display formed in a mobile terminal or other apparatus.

The display 270 is an element for displaying an image and may be one of a Liquid Crystal Display (LCD) and an Active Matrix Organic Light Emitting Diode (AMOLED).

The ITO film 240 has an X-ITO pattern (not shown) for recognizing an X-coordinate of a user's touch position in an upper surface and is attached to an upper surface of the display 270 using an Optical Clear Adhesive (OCA) 260. X-touch sensor bonding patterns 222 and 223 and trace lines 225 and 226 are formed at the upper surface of the ITO film 240. The trace lines 225 and 226 connect one end of the X-ITO pattern to the X-touch sensor bonding patterns 222 and 223. Bonding portions 222a and 223a bonded to the touch screen FPCB 230 are formed at the other end of the X-touch sensor bonding patterns 222 and 223. The X-touch sensor bonding patterns 222 and 223 and the trace lines 225 and 226 are formed with silver.

The window glass 220 protects the touch screen panel display device 200 from the outside and receives user input in the form of touches. The window glass 220 is attached to an upper surface of the ITO film 240 using an OCA 250. A Y-ITO pattern (not shown) for recognizing a Y-coordinate of the user's touch position, a Y-touch sensor bonding pattern 221, and a trace line 224 for connecting one end of the Y-ITO pattern and the Y-touch sensor bonding pattern 221 are formed in a rear surface of the window glass 220. A bonding portion 221a bonded to the touch screen FPCB 230 is formed at the other end of the Y-touch sensor bonding pattern 221. The Y-touch sensor bonding pattern 221 and the trace line 224 are formed with silver.

As shown in FIGS. 3-5, bonding portions 222a and 223a of the X-touch sensor bonding patterns 222 and 223 are positioned toward the touch screen FPCB 230 (lower direction of FIG. 5) further than the bonding portion 221a of the Y-touch sensor bonding pattern 221. A straight line B-B' passing through the bonding portions 222a and 223a of the X-touch sensor bonding patterns 222 and 223 and a straight line C-C' passing through the bonding portions 221a of the Y-touch sensor bonding pattern 221 have an X-axis separation distance D1.

The touch screen FPCB 230 transmits a touch signal received from the touch sensor bonding patterns 221, 222, and 223 of the window glass 220 and the ITO film 240 to a controller (not shown) and is disposed at a rear surface of the window glass 220. The X-contact point portions 232 and 233 contacting with the bonding portions 222a and 223a of the X-touch sensor bonding patterns 222 and 223 are formed at a lower surface of the touch screen FPCB 230, and a Y-contact point portion 231 contacting with the bonding portion 221a of the Y-touch sensor bonding pattern 221 is formed at an upper surface of the touch screen FPCB 230. Because the Y-contact point portion 231 is formed in an upper surface of the touch screen FPCB 230, the Y-contact point portion 231 cannot be shown in FIG. 4, which illustrates a lower surface of the touch screen FPCB 230, but is virtually shown for description.

A straight line D-D' passing through the Y-contact point portion 231 and a straight line E-E' passing through the X-contact point portions 232 and 233 have an X-axis separation distance D2. The X-axis separation distance D2 between the X-contact point portions 232 and 233 and the Y-contact point portions 231 is equal to the X-axis separation distance D1 between the bonding portions 222a and 223a of the X-touch sensor bonding patterns 222 and 223 and the bonding portions 221a of the Y-touch sensor bonding pattern 221. The touch screen FPCB 230 protrudes further than the X-contact point forming portions 235 and 236 in which the X-contact point portions 232 and 233 are formed, and includes a Y-contact point forming portion 234 in which the Y-contact point portion 231 is formed. A U-shaped cut 237 for securing fluidity of alignment is formed between the X-contact point forming portions 235 and 236 and the Y-contact point forming portion 234.

As shown in FIGS. 3-5, the bonding portion 221a of the Y-touch sensor bonding pattern 221 is positioned toward the touch screen FPCB 230 further than the bonding portion 222a and 223a of the X-touch sensor bonding patterns 222 and 223. The bonding portion 221a of the Y-touch sensor bonding pattern 221 and the bonding portions 222a and 223a of the X-touch sensor bonding patterns 222 and 223 are separated from each other in an X-axis direction. As a result, the bonding portion 221a of the Y-touch sensor bonding pattern 221 and the bonding portions 222a and 223a of the X-touch sensor bonding patterns 222 and 223 do not receive heat interference upon FPCB bonding. Accordingly, an ACF swelling failure can be prevented, and bonding of the X and Y-touch sensor bonding patterns 221, 222, and 223 can be performed all at once. In addition, an alignment margin can be secured by the U-shaped cut 237 formed between the Y-contact point forming portion 234 and the X-contact point forming portions 235 and 236, and the touch screen FPCB 230 can be prevented from being torn or crumbled.

The X-ITO pattern and the X-touch sensor bonding pattern are formed in an upper surface of the ITO film, and the Y-ITO pattern and the Y-touch sensor bonding pattern are formed at a rear surface of window glass. However, the X-ITO pattern and the X-touch sensor bonding pattern may also be formed at a rear surface of window glass, and the Y-ITO pattern and the Y-touch sensor bonding pattern may be formed in an upper surface of the ITO film. While the touch screen panel display device 200 is a G2 type touch screen panel display device in which X and Y ITO patterns are separated from an upper surface of an ITO film and a rear surface of window glass, a touch screen panel display device according to an exemplary embodiment of the present invention may also be a G2 type in which both the X-ITO pattern and the Y-ITO pattern are formed in a rear surface of window glass.

Figure 6:
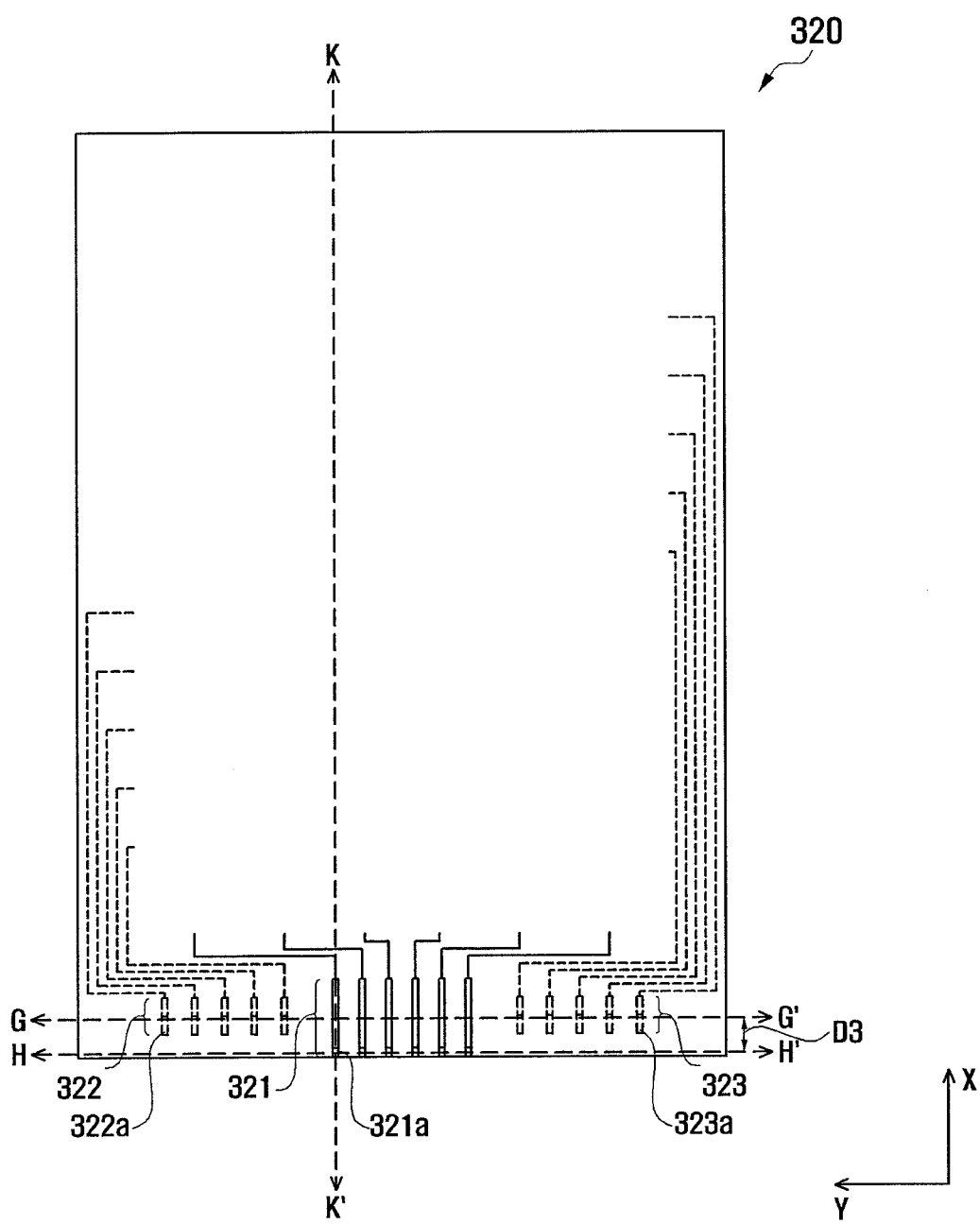
FIG. 6 is a diagram illustrating a rear surface of window glass of a touch screen panel display device according to an exemplary embodiment of the present invention.
Figure 7:
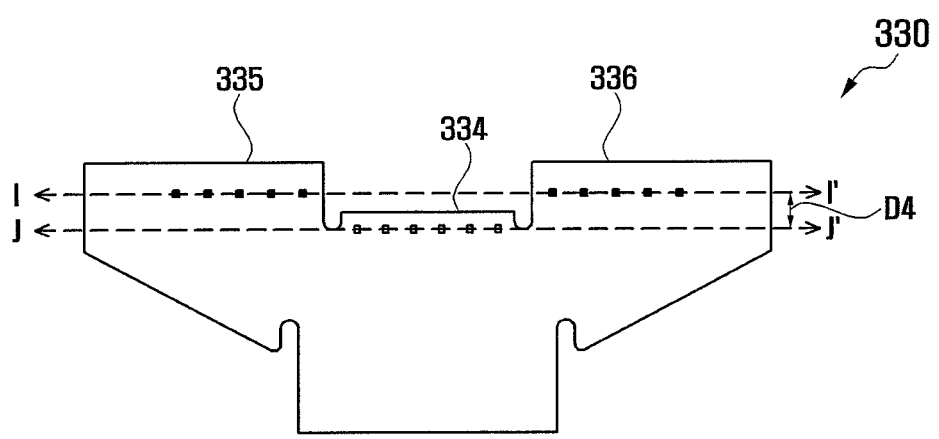
FIG. 7 is a diagram illustrating a lower surface of a touch screen FPCB of a touch screen panel display device according to an exemplary embodiment of the present invention.
Figure 8:
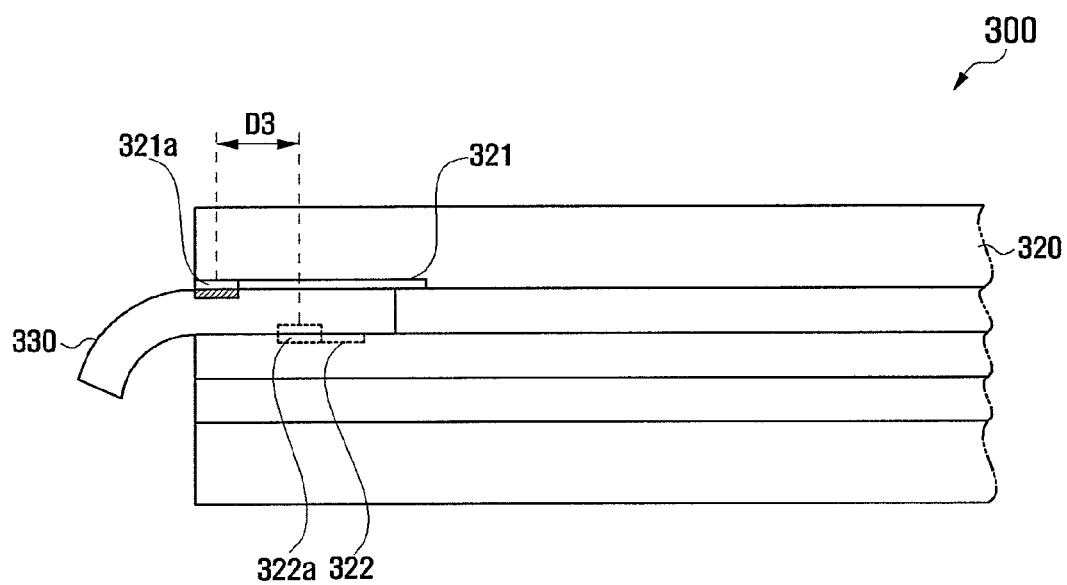
FIG. 8 is a cross-sectional view illustrating a touch screen panel display device taken along a cutting line K-K' of FIG. 6 according to an exemplary embodiment of the present invention.

FIG. 6 is a diagram illustrating a rear surface of window glass of a touch screen panel display device according to an exemplary embodiment of the present invention, FIG. 7 is a diagram illustrating a lower surface of a touch screen FPCB of a touch screen panel display device according to an exemplary embodiment of the present invention, and FIG. 8 is a cross-sectional view illustrating a touch screen panel display device taken along a cutting line K-K' of FIG. 6 according to an exemplary embodiment of the present invention.

Referring to FIGS. 6 to 8, a touch screen panel display device 300 according to an exemplary embodiment of the present invention is described. In the touch screen panel display device 300, a bonding portion 321a of a Y-touch sensor bonding pattern 321 is positioned toward a touch screen FPCB 330 (lower direction of FIG. 8) further than bonding portions 322a and 323a of X-touch sensor bonding patterns 322 and 323, unlike the touch screen panel display device 200 shown in FIGS. 3-5. In addition, in the touch screen FPCB 330, X-contact point forming portions 335 and 336 protrude further than a Y-contact point forming portion 334. Except for this configuration, the touch screen panel display device 300 has the same configuration as that of the touch screen panel display device 200.

As described above, according to exemplary embodiments of the present invention, as a bonding portion of a Y-touch sensor bonding pattern is positioned toward a touch screen FPCB further than a bonding portion of an X-touch sensor bonding pattern or as a bonding portion of an X-touch sensor bonding pattern is positioned toward a touch screen FPCB further than a bonding portion of a Y-touch sensor bonding pattern, a position of FPCB bonding changes and thus an ACF swelling failure occurring as heat reapplied to a location at which bonding is already complete can be prevented.

In addition, because a distance between the bonding portion of the Y-touch sensor bonding pattern and the bonding portion of the X-touch sensor bonding pattern increases, heat interference between both bonding portions decreases and thus bonding of the Y-touch sensor bonding pattern and bonding of the X-touch sensor bonding pattern can be performed together at one time.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A touch screen panel display device, the device comprising:
    a Y-touch sensor bonding pattern having a bonding portion bonded to a touch screen Flexible Printed Circuit Board (FPCB);
    an X-touch sensor bonding pattern having a bonding portion bonded to the touch screen FPCB, the bonding portion of the X-touch sensor bonding pattern being positioned toward the touch screen FPCB further than the bonding portion of the Y-touch sensor bonding pattern; and
    the touch screen FPCB having an X-contact point portion contacting the bonding portion of the X-touch sensor bonding pattern and a Y-contact point portion contacting the bonding portion of the Y-touch sensor bonding pattern.

2. The device of claim 1, wherein the touch screen FPCB comprises:
    an X-contact point forming portion in which the X-contact point portion is formed; and
    a Y-contact point forming portion protruded further than the X-contact point forming portion and in which the Y-contact point portion is formed.

3. The device of claim 2, wherein a U-shaped cut is formed between the X-contact point forming portion and the Y-contact point forming portion.

4. A touch screen panel display device, the device comprising:
- an X-touch sensor bonding pattern having a bonding portion bonded to a touch screen FPCB;
- a Y-touch sensor bonding pattern having a bonding portion bonded to the touch screen FPCB, the bonding portion of the Y-touch sensor bonding pattern being positioned toward the touch screen FPCB further than the bonding portion of the X-touch sensor bonding pattern; and
- the touch screen FPCB having an X-contact point portion contacting the bonding portion of the X-touch sensor bonding pattern and a Y-contact point portion contacting the bonding portion of the Y-touch sensor bonding pattern.

5. The device of claim 4, wherein the touch screen FPCB comprises:
- a Y-contact point forming portion in which the Y-contact point portion is formed; and
- an X-contact point forming portion protruding further than the Y-contact point forming portion and in which the X-contact point portion is formed.

6. The device of claim 5, wherein a U-shaped cut is formed between the X-contact point forming portion and the Y-contact point forming portion.

7. A touch screen panel display, the display comprising:
- a display unit for displaying an image;
- an Indium Tin Oxide (ITO) film arranged above the display unit;
- a protector for protecting the touch screen panel display from the outside; and
- a Flexible Printed Circuit Board (FPCB) arranged between the ITO film and the protector,
- wherein the protector includes a Y-touch sensor bonding pattern arranged at a lower surface of the protector and having a bonding portion for bonding to a Y-contact point portion of the FPCB,
- wherein the ITO film includes an X-touch sensor bonding pattern arranged at an upper surface of the ITO film and having a bonding portion for bonding to an X-contact point portion of the FPCB, and
- wherein the bonding portion of the Y-touch sensor bonding pattern is spaced apart from the bonding portion of the X-touch sensor bonding pattern such that a line perpendicular to the bonding portion of the Y-touch sensor bonding pattern and passing through the bonding portion of the Y-touch sensor bonding pattern does not intersect the bonding portion of the X-touch sensor bonding pattern.

8. The display of claim 7, wherein the FPCB comprises a connector for connecting the FPCB to a controller.

9. The display of claim 8, wherein the bonding portion of the Y-touch sensor bonding pattern is disposed closer to the connector than the bonding portion of the X-touch sensor bonding pattern.

10. The display of claim 8, wherein the bonding portion of the X-touch sensor bonding pattern is disposed closer to the connector than the bonding portion of the Y-touch sensor bonding pattern.

* * * * *